United States Patent [19]
Zickendraht et al.

[11] 3,725,384
[45] Apr. 3, 1973

[54] SUBSTITUTED PHENYL-AZO-PHENYL-AZO-PHENYL COMPOUNDS

[75] Inventors: Christian Zickendraht, Binningen; Alfred Fasciati, Bottmingen, both of Switzerland

[73] Assignee: Ciba-Geigy AG, Basel, Switzerland

[22] Filed: Apr. 10, 1970

[21] Appl. No.: 27,458

[30] Foreign Application Priority Data

Apr. 17, 1969 Switzerland..........................5821/69

[52] U.S. Cl. .................................260/186, 8/4, 8/50, 260/174, 260/177, 260/184, 260/191
[51] Int. Cl. .............................................C09b 31/02
[58] Field of Search.......260/186, 191, 174, 177, 184

[56] References Cited

UNITED STATES PATENTS 3,496,162   2/1970   Groebke et al..................260/186 X

FOREIGN PATENTS OR APPLICATIONS 413,168   12/1966   Switzerland..........................260/186
973,885   10/1964   Great Britain........................260/186

Primary Examiner—Lewis Gotts
Assistant Examiner—C. F. Warren
Attorney—Harry Goldsmith, Joseph G. Kolodny and Mario A. Monaco

[57] ABSTRACT

Disazo compounds of the formula

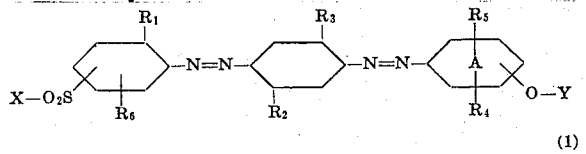

(1)

in which $R_1$ and $R_6$ each represents a hydrogen or a halogen atom or a nitro, alkyl or alkoxy group, $R_2$, $R_3$, $R_4$ and $R_5$ each represents a hydrogen atom or an alkyl or alkoxy group, X represents an amino group bound to the $-SO_2$ bridge by way of its nitrogen atom and Y represents an alkyl group or a group of the formula $B-SO_2-$, in which B represents a low-molecular alkyl group or a benzene residue and in which the benzene ring A can be fused to another benzene ring and the Y—O group is in ortho- or para-position to the azo bridge, are valuable dyestuffs suitable for the spin-coloration of cellulose esters.

8 Claims, No Drawings

SUBSTITUTED PHENYL-AZO-PHENYL-AZO-PHENYL COMPOUNDS

This invention provides disazo compounds free from salt-forming groups that correspond to the general formula

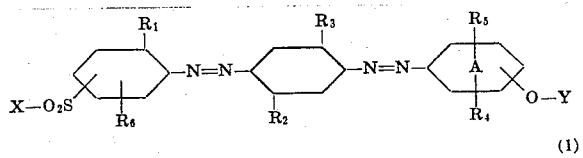

(1)

in which $R_1$ and $R_6$ each represents a hydrogen or a halogen atom or a nitro, alkyl or alkoxy group, $R_2$, $R_3$, $R_4$ and $R_5$ each represents a hydrogen atom or an alkyl or alkoxy group, X represents an amino group bound to the $—SO_2$ bridge by way of its nitrogen atom and Y represents an alkyl group or a group of the formula B—$SO_2$—, in which B represents a low-molecular alkyl group or a benzene residue, preferably a group of the formula

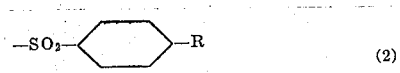

(2)

in which R represents a hydrogen or a halogen atom or an alkyl group. The benzene ring A may be fused to another benzene ring, the Y—O group then being in ortho- or para-position to the azo bridge.

When the substituents $R_1$ to $R_5$ are not hydrogen atoms or when $R_1$ and $R_6$ are not halogen atoms, they are preferably low-molecular groups having one to four carbon atoms in the alkyl chain, that is to say, methyl, ethyl, propyl or butyl groups or methyloxy, ethyloxy, propyloxy or butyloxy groups. When $R_1$ and $R_6$ are halogen atoms they are preferably chlorine atoms. When Y represents an alkyl group it is also preferably a low-molecular alkyl group having one to four carbon atoms. When R represents a halogen atom it is preferably a chlorine atom. The amino group X is primarily a secondary or tertiary amino group, for example, an N-alkylamide ($C_1$-4-alkylamino), N-alkoxyalkylamide ($C_3$-6-alkoxyalkylamino or N,N-dialkylamide group, in which case the alkyl residues can also be cyclic alkyl residues, for example, as in the N-cyclohexylamide group. The substituents bound to the nitrogen atom of the amino group X can also be aromatic residues, for example, as in the case of the N-phenylamide residue or the N-phenyl-N-methylamide residue. The group X can also contain aralkyl residues, for example, as in the N-phenylmethylamide residue. The group X can also be a hetero-cyclic residue containing a ring nitrogen atom and which is bound to the $—O_2S$ bridge by way of the ring nitrogen atom, for example, the morpholyl, 1,4-thiazinyl, piperidinyl or piperazinyl residue.

The present invention also provides a process for preparing the compounds corresponding to formula (1) by a method known per se, which comprises diazotizing a 1-aminobenzene-2-, -3- or -4-sulphonic acid amide, for example, 1-amino-6-methylbenzene-3-sulphonic acid dimethylamide or 1-amino-6-chloro-4-sulphonic acid propylamide, and coupling it with an aminobenzene that couples in para-position, for example, 1-amino-2,5-dimethoxybenzene, 1-amino-2-methylbenzene or an aminobenzene-N-methanesulphonic acid, the methanesulphonic acid being split off, in this case by treatment with an alkali after the coupling process, subsequently diazotizing the product obtained and coupling it with a phenol that couples in ortho- or para-position, for example, 1-hydroxy-2-methylbenzene, 1-hydroxy-5-methoxybenzene or α-naphthol, and etherifying the phenolic HO group, for example, with an alkylhalide, for example, methyl chloride, or a dialkyl sulphate, or esterifying with an alkane- or benzene-sulphonic acid halide, for example, 4-methylbenzene-1-sulphonic acid chloride.

The following are given as examples of starting substances of the 1-aminobenzene-2-, -3- or -4-sulphonic acid amide series:

1-amino-6-methoxybenzene-3- or -4-sulphonic acid amide, 1-amino-6-methylbenzene-3- or -4-sulphonic acid amide, 1-amino-6-chlorobenzene-4-sulphonic acid amide, 1-aminobenzene-3- or -4-sulphonic acid-N-isopropylamide, 1-amino-6-ethoxybenzene-3- or -4-sulphonic acid-N-isopropylamide, 1-amino-4-nitrobenzene-2-sulphonic acid-N-methylamide, 1-amino-6-nitrobenzene-4-sulphonic acid-N-isopropylamide, 1-amino-3,6-dichlorobenzene-4-sulphonic acid-N-butylamide, 1-amino-4-methylbenzene-2-sulphonic acid-N-methylamide, 1-amino-4-chlorobenzene-2-sulphonic acid-N-isopropylamide, 1-amino-6-methoxybenzene-3-sulphonic acid-N-cyclohexylamide, 1-aminobenzene-4-sulphonic acid-N-phenylamide, 1-amino-6-propylbenzene-3- or -4-sulphonic acid-N-ethylamide, 1-aminobenzene-4-sulphonic acid-N,N-dimethyloxyethylamide, 1-aminobenzene-4-sulphonic acid-N-piperidide, 1-aminobenzene-3-sulphonic acid-N-ethyl-N-phenylamide, 1-aminobenzene-3-sulphonic acid-N-morpholide, 1-aminobenzene-4-sulphonic acid-N-methyl-N-cyclohexylamide, 1-aminobenzene-3-sulphonic acid ethyleneimide, 1-aminobenzene-4-sulphonic acid-N,γ-methoxypropylamide, 1-amino-6-chlorobenzene-3-sulphonic acid-N,γ-isopropoxypropylamide, 1-aminobenzene-4-sulphonic acid-N-cyclohexylamide, 1-aminobenzene-3-sulphonic acid-N,γ-isopropoxypropylamide, 1-aminobenzene-3-sulphonic acid-N-cyclohexylamide, 1-aminobenzene-3-sulphonic acid-N-morpholide, 1-aminobenzene-3-sulphonic acid-N-phenylamide, 1-aminobenzene-3-sulphonic acid-N,N-dibutylamide, 1-amino-6-methoxybenzene-3-sulphonic acid-N-isopropylamide, 1-aminobenzene-3-sulphonic acid amide, 1-aminobenzene-4-sulphonic acid-N,γ-isopropoxypropylamide, 1-amino-6-methylbenzene-4-sulphonic acid-N-isopropylamide, 1-amino-6-methylbenzene-3-sulphonic acid-N-isopropylamide, 1-amino-6-methoxybenzene-4-sulphonic acid-N-isopropylamide, 1-amino-6-chlorobenzene-4-sulphonic acid-N-isopropylamide, 1-aminobenzene-3-sulphonic acid amide, 1-aminobenzene-4-sulphonic acid amide, 1-amino-6-ethylbenzene-4-sulphonic acid-N,N-dibutylamide, 1-amino-6-butylbenzene-3-sulphonic acid-N-butylamide, 1-amino-6-ethoxybenzene-4-sulphonic acid-N,β-methoxyethylamide, 1-amino-6-bromobenzene-4-sulphonic acid-N,β-methoxyethylamide, 1-aminobenzene-4-sulphonic acid-N-propylamide, 1-amino-6-propylbenzene-3-sulphonic acid-N-methylamide, 1-amino-6-propoxybenzene-4-sulphonic acid-N-ethylamide, 1-amino-6-methylbenzene-4-sulphonic acid-N-methylamide, 1-amino-6-chlorobenzene-3-sulphonic acid amide, 1-amino-6-isopropoxybenzene-3-sulphonic acid-N-ethylamide, 1-aminobenzene-3-sulphonic acid-N-propylamide, 1-amino-6-bromobenzene-3-sulphonic acid-N-methoxyethylamide and 1-aminobenzene-4-sulphonic acid-N,N-dimethoxyethylamide.

The following are given as examples of coupling components for the first coupling process:
aniline, 1-amino-2,5-dimethoxybenzene, 1-amino-2-methoxy-5-methylbenzene, 1-amino-2-methoxybenzene, 1-amino-2,5-diethoxybenzene, 1-amino-2-methylbenzene. 1-amino-2-ethoxybenzene, 1-amino-2,5-dimethylbenzene, 1-amino-2-propoxybenzene, 1-amino-2-butoxybenzene, 1-amino-2,5-diethylbenzene, 1-amino-2-propylbenzene and 1-amino-3-butylbenzene.

The following are given as examples of phenolic coupling components:
phenol, 1-hydroxy-2- or -3-methoxybenzene, 1-hydroxy-2- or -4-methylbenzene, 1-hydroxy-3- or -4-butoxybenzene, 1-hydroxy-2-(1-methyl)ethyl-5-methylbenzene, 1-hydroxy-2-(1-methyl) propylbenzene, 1-hydroxy-3,4-dimethylbenzene, 1,3-dihydroxybenzene, 1-hydroxy-3-ethoxybenzene, 1-hydroxy-4-(1-methyl) propylbenzene, 1-hydroxy-4-ethylbenzene and $\alpha$- or $\beta$-naphthol.

Etherifying agents that may be especially mentioned are alkylhalides having a low-molecular alkyl group:
methyl or ethyl chloride or bromide, propyl chloride or bromide, 1-methylethyl chloride or bromide, butyl chloride or bromide, 1-methylpropyl chloride or bromide, 2-methylpropyl chloride or bromide and 1,1-dimethylethyl chloride or bromide.

Sulphatoesters, for example, dimethyl or diethyl sulphate, may also be mentioned.

Esterifying agents that are suitable for the introduction of an alkane- or benzene-sulphonic acid residue in accordance with formula (1) are the corresponding acid halides, for example:
methanesulphonic acid chloride, benzenesulphonic acid chloride or bromide, 4-methylbenzene-1-sulphonic acid chloride or bromide and 4-chlorobenzene-1-sulphonic acid chloride or bromide.

The present invention further provides a process for preparing the compounds of the formula (1) wherein a 1-aminobenzene-2-, -3- or -4-sulphonic acid is used as first diazo component instead of a 1-aminobenzene-2-, -3- or -4-sulphonic acid amide; twofold coupling and subsequent etherification or esterification yield dyestuffs of formula (1) that contain an $HO_3S$ group instead of an $X—O_2S$ group. The sulphonic acid group is then converted into a sulphonic acid halide group by a method known per se with a halogenating agent, for example, thionyl chloride, phosphorus (V) chloride or chlorosulphonic acid, which group is then converted into a sulphonic acid amide group by reaction with a primary or secondary amine; this procedure yields a compound of the formula (1) in which X has the meaning given above.

Amines that can be reacted with the compounds containing sulphonic acid halide groups to yield compounds of the formula (1) are the amines corresponding to the 1-aminobenzene-2-, -3- or -4-sulphonic acid amides already mentioned above, for example:
ammonia, isopropylamine, ethylamine, N,N-dimethoxyethylamine, piperidine, N-ethyl-N-phenylamine, 2-ethyl-1-hexylamine, morpholine, N-methyl-N-cyclohexylamine, ethyleneimine, $\gamma$-methoxypropylamine, $\gamma$-isopropoxypropylamine, cyclohexylamine, phenylamine, dibutylamine, butylamine, $\beta$-methoxyethylamine, propylamine, methylamine, dimethylamine, N-methyl-N-phenylamine and N-phenylmethylamine.

The compounds of formula (1) in accordance with the invention are new. They can be used for dyeing a very wide variety of materials, but are specially suitable for the spin-coloration of cellulose esters.

The cellulose esters concerned are primarily cellulose esters of organic acids, especially aliphatic carboxylic acids having a low-molecular alkyl group. The most important of these are cellulose acetates having different degrees of esterification. Preference is given to the spin-coloration of secondary acetate (degree of acetylation: 37 to 41 percent) and triacetate (degree of acetylation: about 60 percent).

The cellulose ester spinning compositions may be obtained by dissolving the purified cellulose ester in a solvent, for example, acetone, methyl acetate, dimethylformamide, dimethyl sulphoxide or a halogenated hydrocarbon, and then removing undissolved matter by filtration. Acetone is the solvent mainly used for the production of a secondary acetate spinning solution, and ethylene chloride or methylene chloride, especially a mixture comprising 86 to 94 percent of methylene chloride and 14 to 6 percent of methanol or ethanol, is used for triacetate. After filtration, a 20 to 30 percent solution can be used for the production of filaments.

Coloration is effected by introducing a compound of the formula (1) into the spinning solution prior to extrusion, no dispersing substance being added to the "-dope." The mixture so obtained is homogenized until the compound is completely dissolved, whereupon spinning can then take place. Complete dissolution of the dyestuffs in the "dope" can be effected without difficulty, and this has the advantage that there is no danger of the spinnerets being clogged by dyestuff particles during spinning. If desired, a pigment, for example, titanium dioxide, can be added to the "dope" prior to spinning to reduce the lustre of the filament.

Spinning of the cellulose acetate spinning solution so obtained to form the cellulose acetate fiber is preferably carried our according to the known dry or wet processes.

This process of coloring cellulose ester spinning solutions with dyestuffs of the formula (1) can also be applied when the colored spinning solutions are to be processed into, for example, plastics moulding compositions (Cellon). Colored cellulose acetate has a specially important use as a flame-resistant substitute for celluloid. The spinning solutions colored in accordance with the invention can also be used, for example, in the production of impregnating agents, adhesives, lacquers, artificial leather, protective coatings, insulating material for cables, drinking straws, artificial straw, membranes and especially films, for example, transparent films for packaging, for use as intermediate layers in automobile glass, for gas masks and for substandard cinematograph film.

The compounds of the formula (1) possess very good building-up properties. The colorations obtained are distinguished by great purity of shade and by excellent properties of fastness; in particular, they display excellent fastness to washing bleaching, for example, chlorine bleaching and peroxide bleaching, and they also show outstanding resistance to dry-cleaning and to the action of light. The dyestuffs do not migrate to the surface of the colored material, and thus the colored textile material displays excellent fastness to rubbing.

Compared with the process of dyeing the manufactured fiber, spin-coloration has the advantage of being cheaper and of requiring smaller plant.

The following Examples illustrate the invention, the parts being by weight, unless otherwise stated.

EXAMPLE 1

Twenty-three parts of the disazo dyestuff of the formula

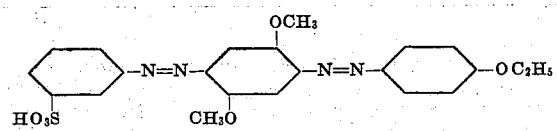

are stirred in 400 parts of chlorobenzene and then completely dehydrated by distillation of about 100 parts of the solvent. The batch is allowed to cool to room temperature, 10 parts of dimethylformamide and 15 parts of thionyl chloride are added and the batch is stirred for 2 hours at 80° to 85° C. The dyestuff dissolves with formation of the sulphochloride. The excess of thionyl chloride is removed by distillation, the batch is allowed to cool, and then 24 parts of isopropoxypropylamine are added. The batch is stirred for 1 hour, the solvent is removed with steam, and the dyestuff of the formula $(CH_3)_2CHO(CH_2)_3NH-O_2S$—⟨ ⟩—$N=N$—⟨ $OCH_3$ / $OCH_3$ ⟩—$N=N$—⟨ ⟩—$OC_2H_5$ is isolated by filtration. It dissolves in a cellulose acetate spinning solution to produce a bright orange shade of high tinctorial strength and possessing outstanding fastness to light and wet treatments.

The dyestuffs listed in Column I of the following Table are produced according to the same process. They color acetate fiber spinning solutions the shades indicated in Column II.

| I | II |
|---|---|
| $CH_3NH-O_2S$—⟨ $CH_3$ ⟩—$N=N$—⟨ $OCH_3$ / $OCH_3$ ⟩—$N=N$—⟨ ⟩—$OC_2H_5$ | Orange. |
| $(CH_3)_2CHHN-O_2S$—⟨ ⟩—$N=N$—⟨ $OCH_3$ / $OCH_3$ ⟩—$N=N$—⟨ $Cl$ ⟩—$OC_2H_5$ | Do. |
| ⟨H⟩—$HN-O_2S$—⟨ $OCH_3$ ⟩—$N=N$—⟨ $OCH_3$ / $OCH_3$ ⟩—$N=N$—⟨ ⟩—$OC_2H_5$ | Scarlet. |
| $C_4H_9HN-O_2S$—⟨ $Cl$ / $Cl$ ⟩—$N=N$—⟨ $OCH_3$ / $OCH_3$ ⟩—$N=N$—⟨ ⟩—$OC_2H_5$ | Orange. |
| ⟨ ⟩—$HN-O_2S$—⟨ ⟩—$N=N$—⟨ $OCH_3$ / $OCH_3$ ⟩—$N=N$—⟨ ⟩—$OCH_3$ | Do. |

| I | II |
|---|---|
| 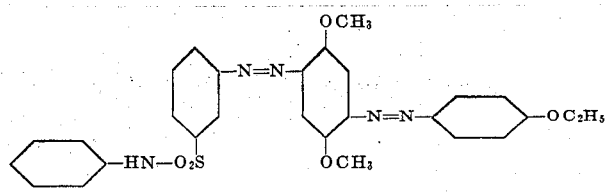 | Do. |
| 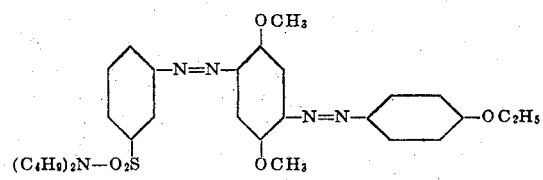 | Do. |
| 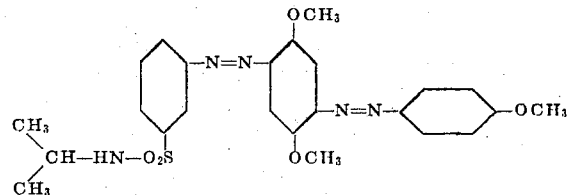 | Do. |
| 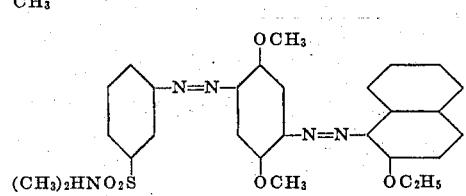 | Scarlet. |
| 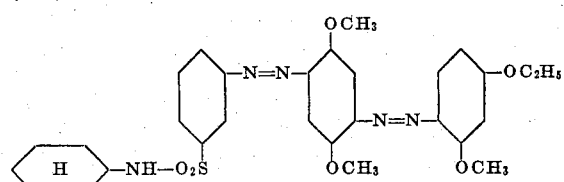 | Orange. |
| 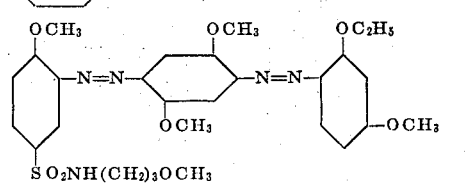 | Do. |
| 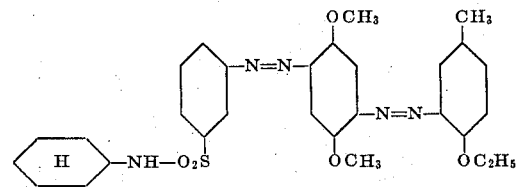 | Do. |
| 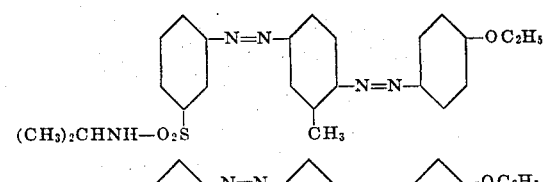 | Do. |
| 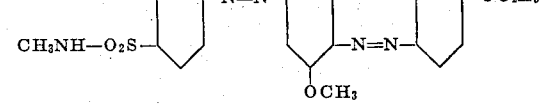 | Do. |
EXAMPLE 2
Seven parts of sodium nitrite are introduced, in portions, at a temperature of 10° to 15° C, into 200 parts of concentrated sulphuric acid. The batch is heated to 70° to 75° C within 30 minutes and stirred for one hour at that temperature. The batch is cooled to 0° to 5° C, 41.8 parts of the dyestuff of the formula
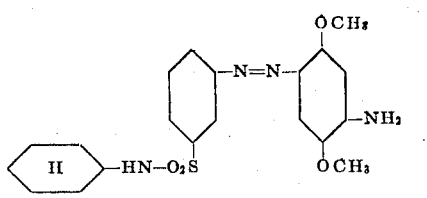

are introduced within 1 hour, and the batch is then stirred for 12 hours at room temperature. It is discharged on to ice, the diazo compound is isolated by filtration and then washed with ice water. Coupling with hydroxybenzene and ethylation of the hydroxyl group of the disazo dyestuff according to a known method yields the dyestuff of the formula

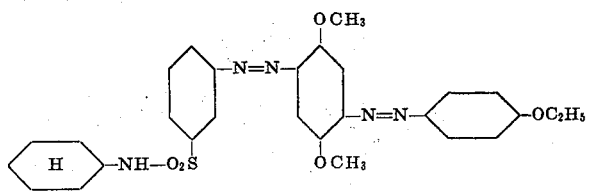

It dissolves in the acetate "dope" to produce an orange shade possessing outstanding fastness to light and wet treatments.

By replacing as starting substance the sulphonic acid cyclohexylamide derivative specified above with the corresponding sulphonic acid butylamide derivative and esterifying the terminal phenolic hydroxyl group with para-toluenesulphonic acid chloride, a dyestuff of the formula

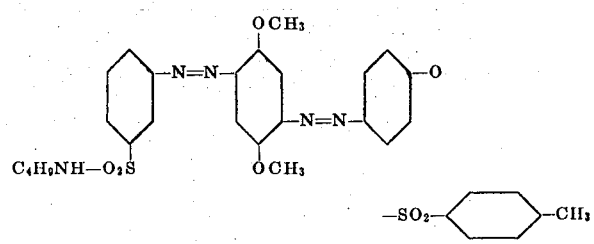

is obtained that colors the acetate fiber "dope" an orange shade.

Dyestuffs having similar properties may be obtained by using as pre-esterifying agent methanesulphonic acid chloride or benzenesulphonic acid chloride.

We claim:

1. Disazo compounds of the formula

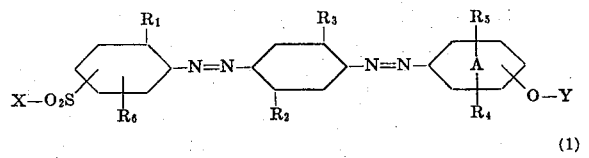

(1)

in which $R_1$ and $R_6$ each represents hydrogen, chlorine, bromine, nitro, $C_{1-3}$alkoxy, $C_{1-4}$alkyl or alkoxyalkyl of up to four carbon atoms, $R_2$, $R_3$, $R_4$ and $R_5$ each represents hydrogen, alkyl or alkoxy having one to four carbon atoms, X represents cyclohexylamino, phenylamino and $C_{3-6}$alkoxyalkylamino and Y represents an alkyl having one to four carbon atoms, $CH_3-C_6H_4-SO_2-$, $C_6H_5-SO_2-$, $Cl-C_6H_4-SO_2-$ or $CH_3-SO_2$, the Y—O group is in ortho- or para-position to the azo bridge and in which the benzene ring A can be fused to another benzene ring.

2. Disazo compounds as claimed in claim 1 corresponding to the formula (1) in which $R_1$ and $R_6$ each represents hydrogen, chlorine, bromine, nitro, $C_{1-3}$alkoxy, $C_{1-4}$ alkyl or alkoxyalkyl of up to four carbon atoms, $R_2$, $R_3$, $R_4$ and $R_5$ each represents hydrogen, alkyl or alkoxy having one to four carbon atoms and Y represents alkyl having one to four carbon atoms, $CH_3-C_6H_4-SO_2-$, $C_6H_5-SO_2-$, $Cl-C_6H_4-SO_2-$ or $CH_3-SO_2-$ and the Y—O group is in para-position to the azo bridge.

3. Disazo compounds of the formula

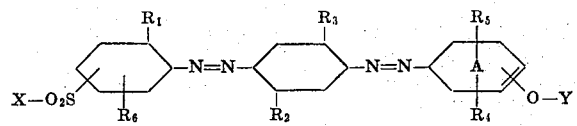

in which $R_1$ and $R_6$ each represents hydrogen, chlorine, bromine, nitro, $C_{1-3}$alkoxy, $C_{1-4}$alkyl or alkoxyalkyl of up to four carbon atoms, $R_2$, $R_3$, $R_4$ and $R_5$ each represents hydrogen, alkyl or alkoxy having one to four carbon atoms, X represents cyclohexylamino, phenylamino and $C_{3-6}$alkoxyalkylamino, Y represents $CH_3-C_6H_4-SO_2-$, $C_6H_5-SO_2-$, $Cl-C_6H_4-SO_2-$ or $CH_3-SO_2-$, the Y—O group is in ortho- or paraposition to the azo bridge and the benzene ring A can be fused to another benzene ring.

4. Disazo compounds as claimed in claim 3 wherein Y is $Cl-C_6H_4-SO_2-$.

5. The dyestuff which in its free acid form corresponds to the formula

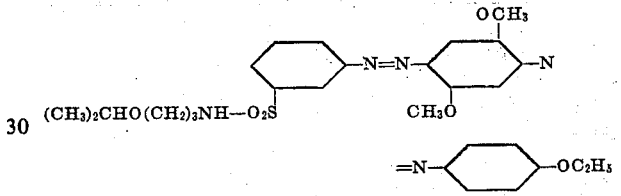

6. The dyestuff which in its free acid form corresponds to the formula

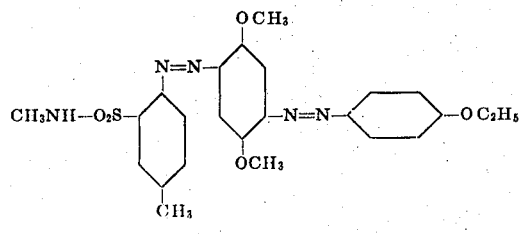

7. The dyestuff which in its free acid form corresponds to the formula

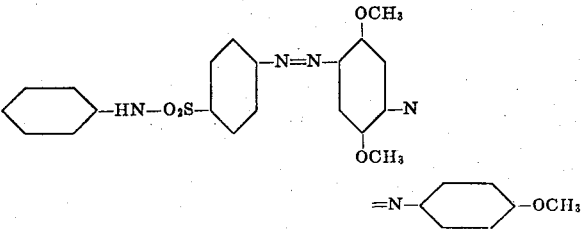

8. The dyestuff which in its free acid form corresponds to the formula

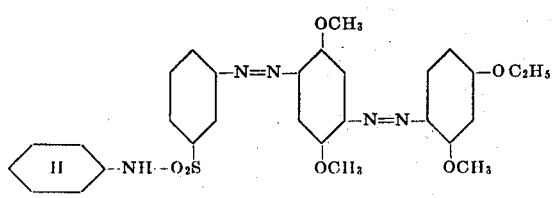

* * * * *

UNITED STATES PATENT OFFICE
CERTIFICATE OF CORRECTION

Patent No. 3,725,384    Dated April 3, 1973

Inventor(s) CHRISTIAN ZICKENDRAHT ET AL

It is certified that error appears in the above-identified patent and that said Letters Patent are hereby corrected as shown below:

Column 10, line 17, delete "$Cl-C_6H_4-SO_2-$" and insert

-- $Cl-C_6H_4-SO_2-$ --

Signed and sealed this 4th day of June 1974.

(SEAL)
Attest:

EDWARD M. FLETCHER, JR.
Attesting Officer

C. MARSHALL DANN
Commissioner of Patents